(12) United States Patent
Webb

(10) Patent No.: US 6,826,631 B2
(45) Date of Patent: Nov. 30, 2004

(54) SYSTEM AND METHOD FOR INDICATING THE STATUS OF A COMMUNICATIONS LINK AND TRAFFIC ACTIVITY ON NON-PROTOCOL AWARE MODULES

(75) Inventor: Randall K. Webb, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 108 days.

(21) Appl. No.: 10/207,869

(22) Filed: Jul. 31, 2002

(65) Prior Publication Data

US 2004/0024934 A1 Feb. 5, 2004

(51) Int. Cl.⁷ .............................. G06F 13/00
(52) U.S. Cl. .................. 710/6; 710/5; 710/15; 710/16; 340/641; 709/223
(58) Field of Search .......... 709/223; 370/254; 340/641; 710/5, 6, 15, 16

(56) References Cited

U.S. PATENT DOCUMENTS

| | | | | |
|---|---|---|---|---|
| 4,990,896 A | * | 2/1991 | Gray | 340/641 |
| 6,400,730 B1 | * | 6/2002 | Latif et al. | 370/466 |
| 6,513,120 B2 | * | 1/2003 | Kanzawa et al. | 713/201 |
| 6,591,310 B1 | * | 7/2003 | Johnson | 710/3 |
| 6,606,679 B2 | * | 8/2003 | Solomon et al. | 710/314 |
| 6,628,203 B1 | * | 9/2003 | Oost | 340/635 |
| 6,681,248 B1 | * | 1/2004 | Sears et al. | 709/223 |

* cited by examiner

*Primary Examiner*—Rehana Perveen
(74) *Attorney, Agent, or Firm*—Schwegman, Lundberg, Woessner & Kluth, P.A.

(57) ABSTRACT

A system, device, method and computer program to control and set LEDs associated with ports that are non-protocol aware is accomplished. This system, device, method and computer program does not interfere with the normal operation of protocol aware ports. Utilizing this system, device, method and computer program, savings in time and effort for installation and debug of a network system is realized.

21 Claims, 6 Drawing Sheets

SYSTEM AND METHOD FOR INDICATING THE STATUS OF A COMMUNICATIONS LINK AND TRAFFIC ACTIVITY ON NON-PROTOCOL AWARE MODULES

FIELD

The present invention relates to data transfer interface technology in a data network and, more particularly, relates to a system and method for indicating a communications link and traffic activity on non-protocol aware modules.

BACKGROUND

In the rapid development of computers many advancements have been seen in the areas of processor speed, throughput, communications, and fault tolerance. Initially computer systems were standalone devices in which a processor, memory and peripheral devices all communicated through a single bus. Later, in order to improve performance, several processors were interconnected to memory and peripherals using one or more buses. In addition, separate computer systems were linked together through different communications mechanisms such as, shared memory, serial and parallel ports, local area networks (LAN) and wide area networks (WAN). However, these mechanisms have proven to be relatively slow and subject to interruptions and failures when a critical communications component fails.

More recently, exceptionally high-speed serial data networks such as InfiniBand™ have been created in order to interconnect multiple hosts, such as computer systems and Input/Output (I/O) controllers to one another via switches. Further, switches may be interconnected to each other, via one or more ports, and a given host may be connected to multiple switches, via one or more ports, for relaying data within the data network.

However, in the case of a complex data network, a literal sea of cables and port connections may exist. Therefore, connecting and troubleshooting port connections and failures may be difficult. In order to facilitate such troubleshooting each port in a switch may be provided with a link/activity light emitting diode (LED) indicator to indicate the status of the given port. However, where non-protocol aware (NPA) modules are utilized (e.g., in a modular InfiniBand™ switch), the monitoring of traffic over a given port may not be possible and therefore control of the LED indicator may be absent. These non-protocol aware modules act as simple repeaters that buffer the data between the network cables and the switching logic. This is done in order to reduce the cost of the modules and related-hardware as well as maximize the possible transfer rate. However, without the aid of a functioning LED indicator on a port, troubleshooting and connecting ports can be extremely difficult.

Therefore, there is a need for a system, device, method and computer program that will enable control of LEDs associated with ports so that a visual monitor of the port status is possible. This system, device, method and computer program should operate for non-protocol aware modules without interfering with the transmission of data.

BRIEF DESCRIPTION OF THE DRAWINGS

A better understanding of the present invention will become apparent from the following detailed description of exemplary embodiments and the claims when read in connection with the accompanying drawings, all forming a part of the disclosure of this invention. While the foregoing and following written and illustrated disclosure focuses on disclosing example embodiments of the invention, it should be clearly understood that the same is by way of illustration and example only and the invention is not limited thereto. The spirit and scope of the present invention are limited only by the terms of the appended claims.

The following represents brief descriptions of the drawings, wherein.

DETAILED DESCRIPTION

Figure 1:
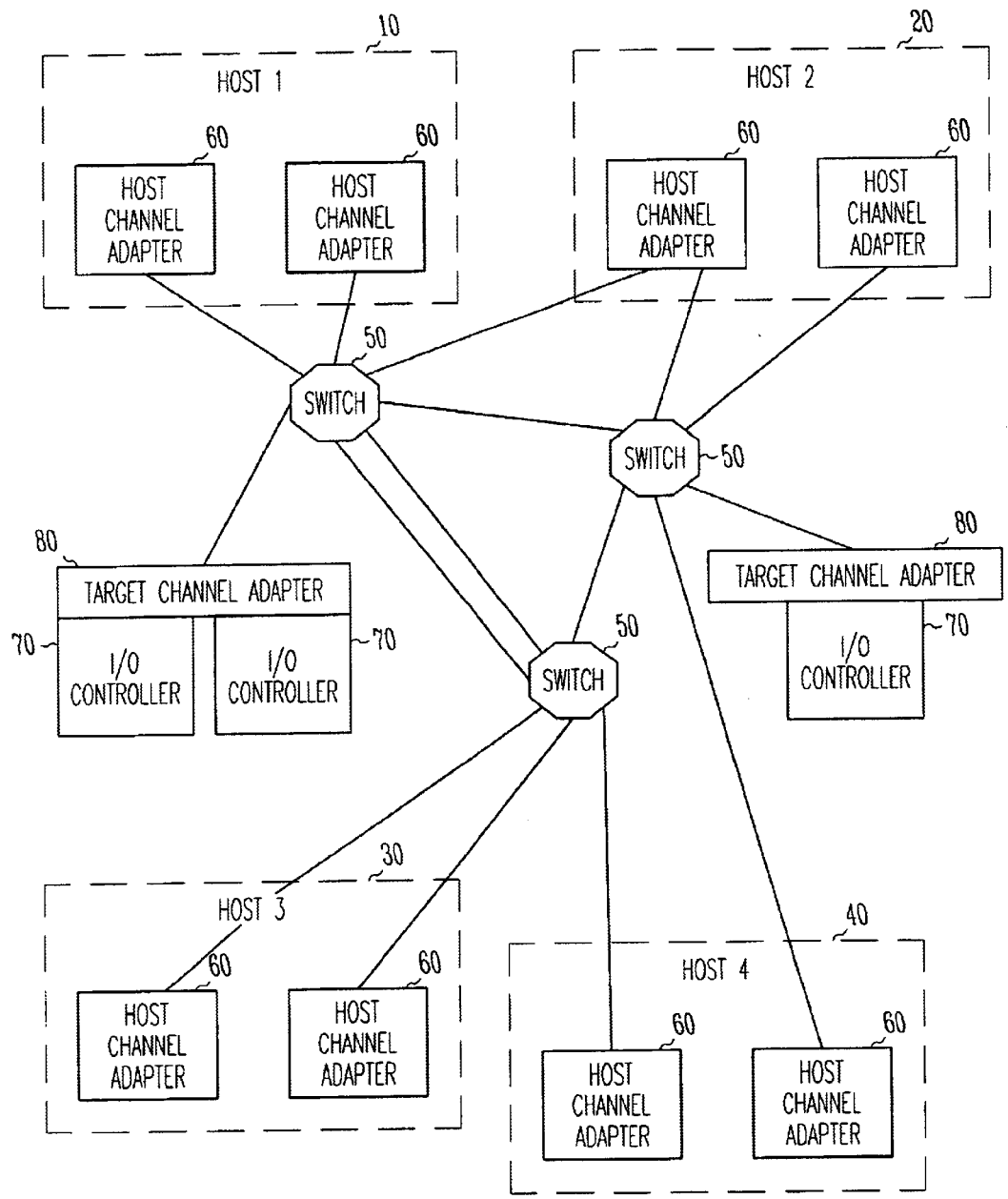
FIG. 1 illustrates an example InfiniBand™ system diagram that may be used by the example embodiments of the present invention.

Before beginning a detailed description of the subject invention, mention of the following is in order. When appropriate, like reference numerals and characters may be used to designate identical, corresponding or similar components in differing figure drawings. Further, in the detailed description to follow, exemplary sizes/models/values/ranges may be given, although the present invention is not limited to the same. As a final note, well-known components of computer networks may not be shown within the figures for simplicity of illustration and discussion, and so as not to obscure the invention.

Various example embodiments of the present invention are applicable for use with all types of data networks, I/O hardware adapters and chipsets, including follow-on chip designs which link together end stations such as computers, servers, peripherals, storage subsystems, and communication devices for data communications. Examples of such data networks may include a local area network (LAN), a wide area network (WAN), a campus area network (CAN), a metropolitan area network (MAN), a global area network (GAN), a wireless personal area network (WPAN), and a system area network (SAN), including newly developed computer networks using Future I/O (FIO), InfiniBand™ and Server Net and those data networks including channel-based, switched fabric architectures which may become available as computer technology advances to provide scalable performance. LAN systems may include Ethernet, FDDI (Fiber Distributed Data Interface) Token Ring LAN, Asynchronous Transfer Mode (ATM) LAN, Fiber Channel, and Wireless LAN. However, for the sake of simplicity, discussions will concentrate mainly on a host system including one or more hardware adapters for providing physical links for channel connections in a simple data network having several example nodes (e.g., computers, servers and I/O units) interconnected by corresponding links and switches, although the scope of the present invention is not limited thereto.

Attention now is directed to the drawings and particularly to FIG. 1, in which an example InfiniBand™ system diagram which may be used by various embodiments of the present invention is illustrated. Using an InfiniBand Architecture (IBA) it may be possible to link together a processor-based system 10, through switches 50 to several input/output (I/O) controllers 70, and other processor-based systems 20, 30 and 40. Each processor-based system 10, 20, 30 and 40 may include one or more central processing units (CPU) (not shown), dynamic random access memory (DRAM) (not shown), memory controller (not shown) and a host channel adapter (HCA) 60. I/O controllers 70 communicate to the InfiniBand network, via target channel adapters (TCA) 80. These I/O controllers 70 may be used to provide an I/O service or I/O function, and may operate to control one or more I/O devices such as storage devices (e.g., hard disk drive and tape drive) via a system area network, for example. A plurality of switches 50 may be arranged to establish connection between the processor-based systems 10, 20, 30 and 40 and the I/O controllers 70, via respective host channel adapters 60 and target channel adapters 80. Each switch 50 as well as the channel adapters 60 and 80 may have one or more switch connection points called "ports" provided to establish connection with every other switch 50 and host or target channel adapter 60 or 80, via one or more links. Each switch "port" may be configured to support one or more port operation modes, i.e., one or more links for enabling commands and data to flow between interconnected ports within the InfiniBand network. For example, each switch "port" can be configured to serve as a single link (1x) capable port for transferring data via a single link (typically 0.25 GB/s in each direction, for example), or a multiple link capable port for transferring data via respective multiple links (typically 1.0 GB/s in each direction, for example).

Referring to FIG. 1, the InfiniBand Architecture defines interfaces that move data between two "memory" regions or nodes. Access to an I/O controller 70 and processor-based systems 10, 20, 30 and 40, may be accomplished by send or receive operations, as well as, remote direct memory access (RDMA) read and RDMA write operations. Cluster, host channel adapters 60 and target channel adapters 80 provide the control and logic that allows nodes to communicate to each other over the InfiniBand network. A processor-based system 10, 20, 30 or 40 may have one or more host channel adapters 60 each of which may include one or more ports for redundancy and access to one or more InfiniBand networks. Likewise, each I/O controller 70 may have one or more target channel adapters 80 with multiple ports for redundancy and access to one or more InfiniBand networks. Communications in an InfiniBand architecture may be accomplished through these cluster, host channel adapters 60, target channel adapters 80 directly or through one or more switches 50.

Figure 2:
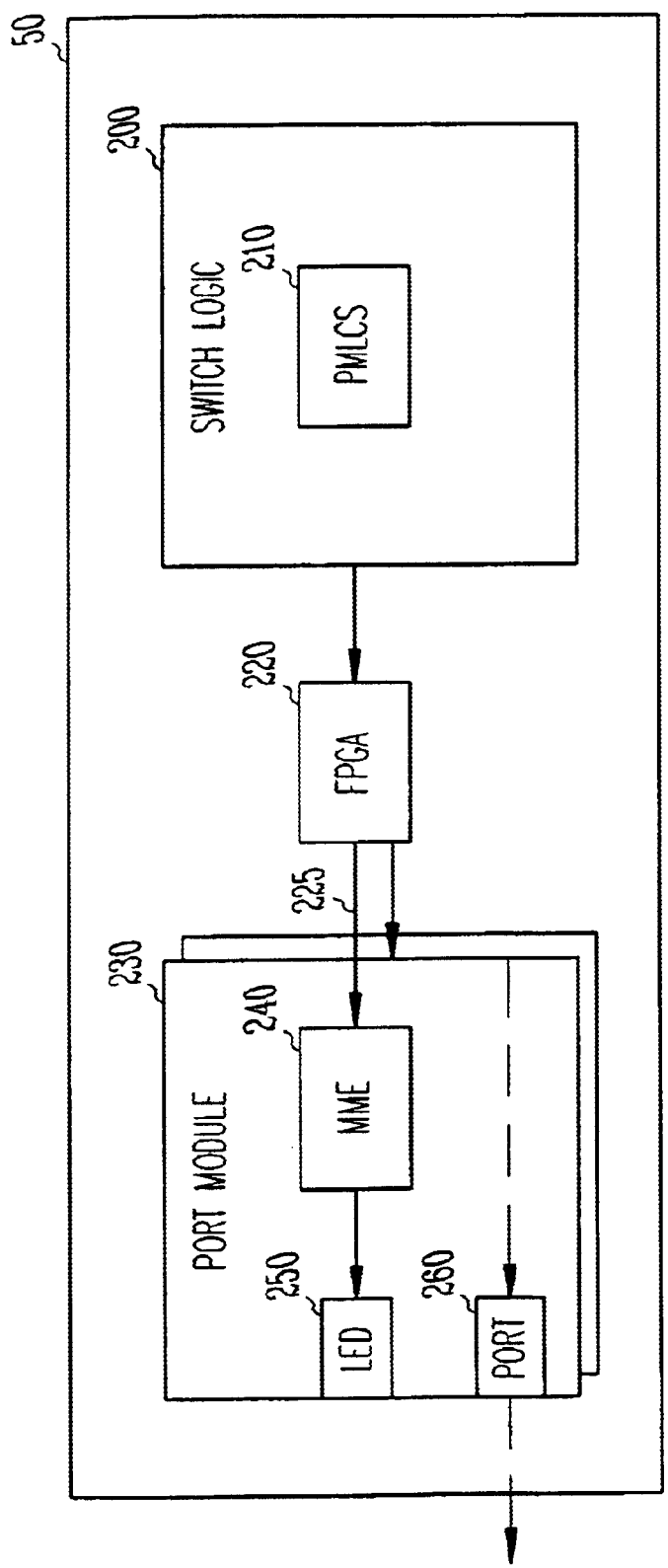
FIG. 2 illustrates an example modular configuration diagram used in the example embodiments of the present invention.
Figure 3:
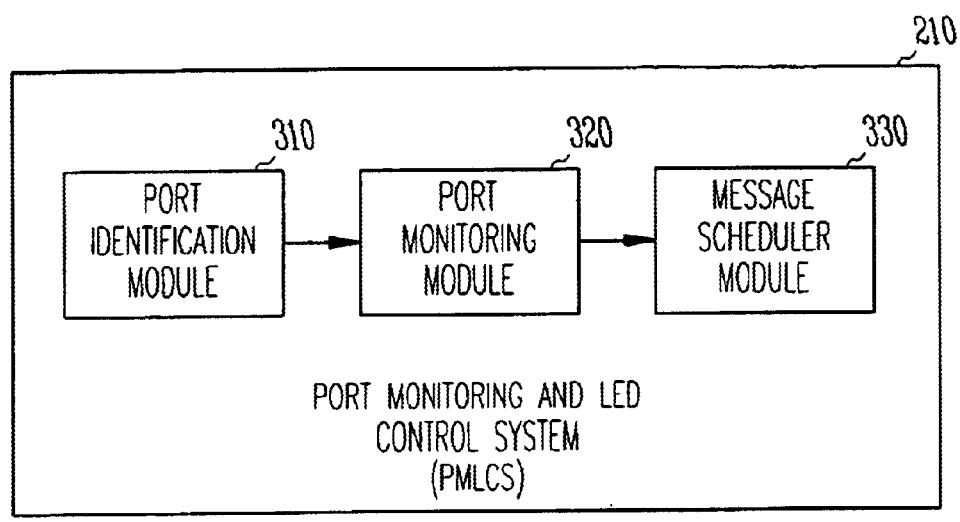
FIG. 3 illustrates an example modular configuration diagram used in the example embodiments of the present invention.
Figure 4:
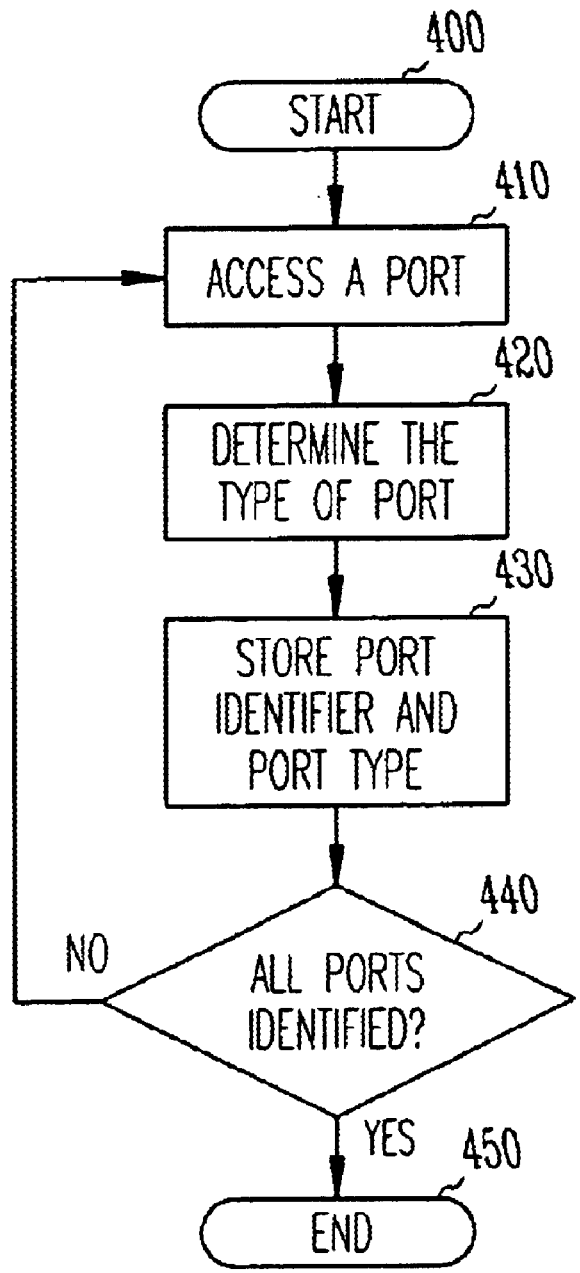
FIG. 4 illustrates an example flowchart for the port identification module used in the example embodiments of the present invention.
Figure 5:
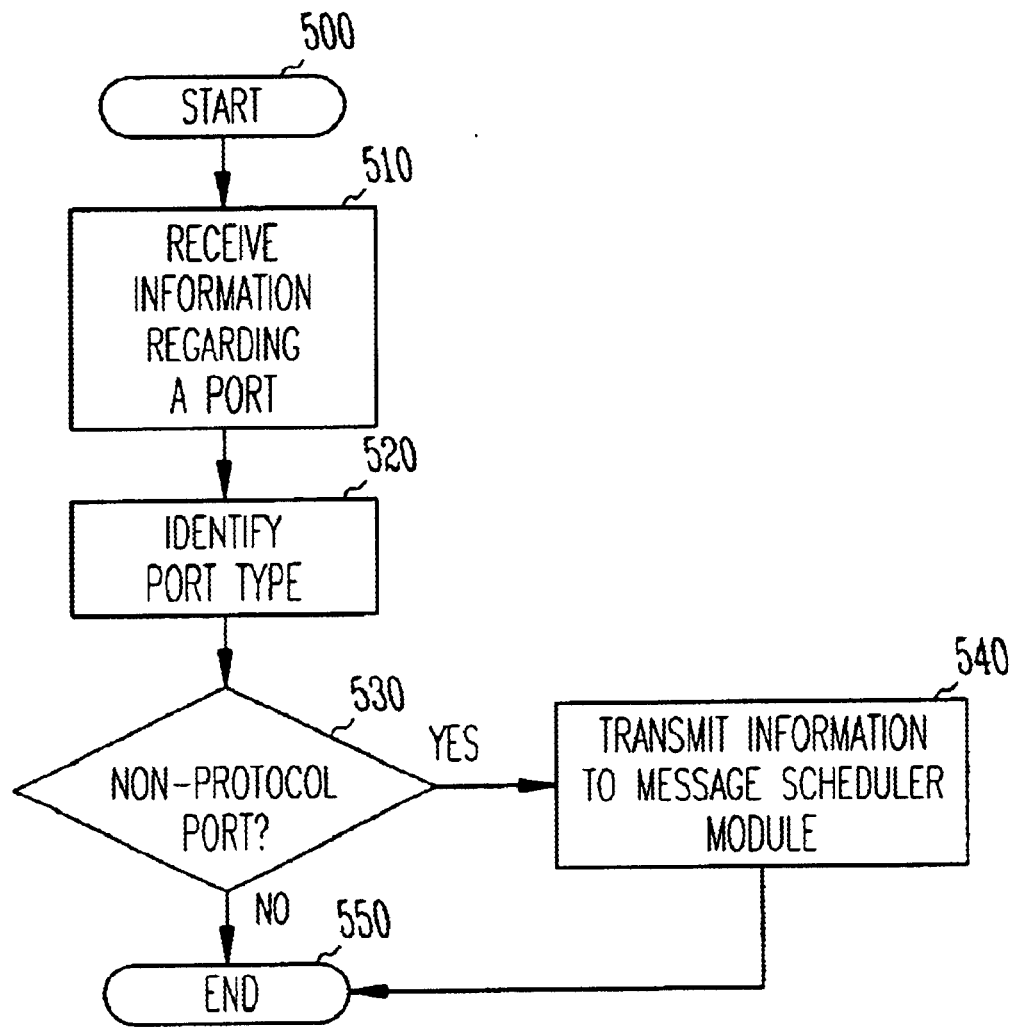
FIG. 5 illustrates an example flowchart for the port monitoring module used in the example embodiments of the present invention.
Figure 6:
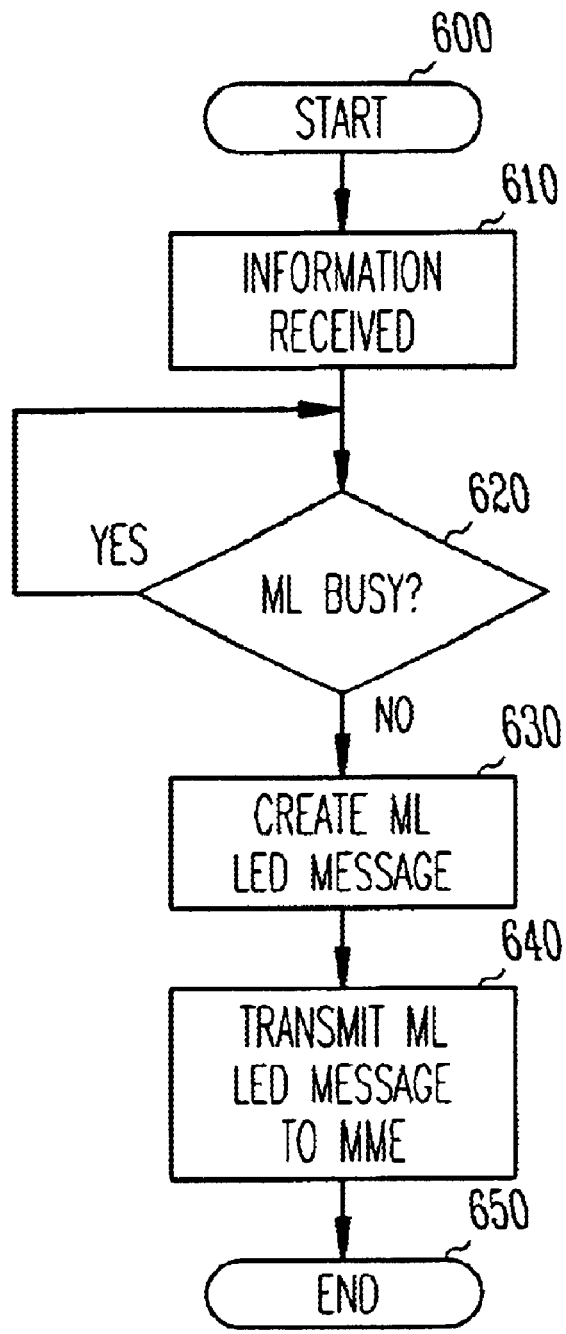
FIG. 6 illustrates an example flowchart for the message scheduler module used in the example embodiments of the present invention.

Before proceeding into a detailed discussion of the logic used by the present invention it should be mentioned that the modular configuration diagrams shown in FIGS. 2 and 3 and the flowcharts shown in FIGS. 4 through 6 contain software, firmware, hardware, processes or operations that correspond, for example, to code, sections of code, instructions, commands, objects, hardware or the like, of a computer program that is embodied, for example, on a storage medium such as floppy disk, CD-Rom (Compact Disc read-only Memory), EP-Rom (Erasable Programmable read-only Memory), RAM (Random Access Memory), hard disk, etc. Further, the computer program can be written in any high-level programming language such as, but not limited to, for example C++ and Visual Basic.

FIG. 2 illustrates an example modular configuration diagram used in the example embodiments of the present invention. This modular configuration diagram depicts the hardware, firmware, and software that may be utilized to control a LED 250 on a non-protocol aware port 260 in a switch 50. In addition, since management link (ML) resides in a switch, port LED indicators may only be monitored using the present invention in a switch, not in channel adapters. However, the monitoring of port activity may reside outside the switch, with appropriate commands sent to the switch resulting in ML messages to the port LED indicators. Each switch 50 may contain multiple inbound and outbound ports for relaying data between links in the InfiniBand network.

As shown in FIG. 2, the switch 50 may contain a switch logic 200 including a port monitoring and LED control system (PMLCS) 210 arranged to provide link and activity for each of its ports; a field-programmable gate array (FPGA) 220; and one or more port modules 230. The field-programmable gate array (FPGA) 220 may be arranged to interpret the link/activity information, create an appropriate management link (ML) command and provide the appropriate management link (ML) to each port module 230, i.e., non-protocol aware (NPA) module or protocol aware module.

Each port module 230 may contain a module management entity (MME) 240, a LED indicator 250 and a port 260. The module management entity (MME) 240 may be connected to the field programmable gate array (FPGA) 220, via a respective management link (ML) 255, and may be arranged to directly control the operation of the LED indicator 250. Alternatively, the FPGA 220 may be included in the switch logic 200, and/or the port monitoring and LED control system (PMLCS) 210 may be located within the FPGA 220, or elsewhere within the switch 50. In such configurations, the switch logic 200 or the FPGA 220 may interface with all port modules 230, and interpret the link/activity information and create the appropriate management link (ML) commands that may be sent to the appropriate port module 230 and LED indicator 250. The management link (ML) commands may be compatible with management link (ML) protocol established by the InfiniBand™ specification.

FIG. 3 illustrates an example modular configuration diagram depicting the PMLCS 210 used in the example embodiments of the present invention. As shown in FIG. 3, the PMLCS 210 may include a port identification module 310, a port monitor module 320, and a message scheduler module 330. The port identification module 310 may be used to determine if a particular piece of information regarding a particular non-protocol aware (NPA) port included in the port modules 230. During communications with the port identification module 310, the port monitoring module 320 may be used to receive information regarding a particular port 260 (i.e., information about the link such as up/down/activity information) and determine the appropriate action to take depending upon the nature of such a port 260. If the port in question is a non-protocol aware (NPA) port, then the information may be transmitted to a message scheduler module 330 to schedule the transmission of LED control commands in a particular order or priority, such as, for example, when the management link (ML) 225 is not busy. Thereafter, the information may be transmitted to the appropriate port module 230, via the management link (ML) 255.

FIG. 4 is an example flowchart for the port identification module 310 used in the example embodiments of the present invention. The port identification module 310 begins execution in operation 400 and immediately proceeds to operation 410. In operation 410, the module management entity (MME) 240 within each port module 230 of the switch 50 is accessed. In operation 420 upon accessing the module management entity (MME) 240 the nature or type of the port module 230 is determined. Port modules 230 will be classified according to two criteria, either protocol aware or non-protocol aware (NPA). If no logic is associated with a port 260 then it is identified as a non-protocol aware (NPA) port 260 (i.e., a "pass-through" module incapable of determining data content on a link). Thereafter, in operation 430 the port identifier number and port type are stored either in the FPGA 220 or the switch logic 200. Processing then proceeds to operation 440 wherein it is determined if all ports accessible within a switch 50 have been identified. If it is determined that all ports have not been identified in operation 440, then processing returns to operation 410. Otherwise, processing proceeds operation 450 where processing terminates.

FIG. 5 is an example flowchart for the port monitoring module 320 used in the example embodiments of the present invention. The port monitoring module 320 begins execution in operation 500 and immediately proceeds to operation 510. In operation 510, link and activity information to be transmitted to a particular port module's MME 240 is received by the port monitoring module 320 from the switch logic 200. Thereafter, the port monitoring module 320 retrieves the port identification for this particular port module 230 from the switch logic 200. Processing then proceeds to operation 530 where it is determined if the port 260 is a non-protocol aware (NPA) port. If the port is a non-protocol aware (NPA) port 260, then processing proceeds to operation 540 where the link and activity information to be transmitted to the port's MME 240 is passed to the message scheduler module 330. However, if the port is a protocol aware port 260, then the link and activity information need not be sent (the protocol aware module will generate its own link and activity information to drive its LED). Processing from either operation 530 ("NO" exit) or operation 540 both proceed to operation 550 where processing terminates.

FIG. 6 is an example flowchart for the message scheduler module 330 used in the example embodiments of the present invention. The message scheduler module 330 begins execution in operation 600 and immediately proceeds to operation 610. In operation 610, link and activity information to be transmitted to the module management entity (MME) 240 included in the port module 230 in question is received. Thereafter, in operation 620 it is determined if the management link (ML) 225 is busy at the given moment. If the management link (ML) 225 is busy, then processing proceeds to loop back to operation 620. However, if the management link (ML) 225 is not busy, then processing proceeds to operation 630. In operation 630, a management link (ML) LED message is generated. This ML-LED message may take one of three forms. First, the ML-LED message may indicate that no link is established, and no data is being transmitted by the port 260 and, as such, the LED indicator 250 included in the port module 230 in question may be turned "off". Second, the ML-LED message may indicate that the port 260 is linked to another device and, as such, the LED indicator 250 may be turned "on". Third, the ML-LED message may indicate that data is being transmitted over the port 260 and, as such, the LED indicator 250 may be instructed to blink at a predetermined rate. Regardless of the status, the ML-LED message is transmitted to the module management entity (MME) 240 included in the port module 230 in operation 640. Thereafter processing proceeds to operation 650 where processing terminates.

The benefit resulting from the present invention is that control of an LED indicator associated with the port in one or more non-protocol aware (NPA) modules within a switch may be accomplished without interrupting the normal operations of the switch while utilizing the existing switch infrastructure (i.e., the management link "ML" to each module and the module's MME). Utilizing the present invention the costs associated with properly driving the link and activity LED indicator on a non-protocol aware (NPA) module (e.g., circuitry, module board space, power consumption, etc.) can be dramatically reduced. Likewise, the amount of time and effort required to install cables in a server network and debug problems in a server network can be drastically reduced.

While we have shown and described only a few examples herein, it is understood that numerous changes and modifications as known to those skilled in the art could be made to the example embodiment of the present invention. For example, the data network as shown in FIG. 1 may be configured differently or employ some or different components than those illustrated. Such a data network may include a local area network (LAN), a wide area network (WAN), a campus area network (CAN), a metropolitan area network (MAN), a global area network (GAN) and a system area network (SAN), including newly developed computer networks using Future I/O (FIO) and Server Net and those networks which may become available as computer technology advances in the future. However, the port configuration for LED indicators shown in FIGS. 2–3 on a switch may need to be adjusted accordingly. In addition, the port configuration for LED indicators can be implemented either in hardware or software module (i.e., an application program) installed in the host node (end node or switch) in the InfiniBand network. Therefore, we do not wish to be limited to the details shown and described herein, but intend to cover all such changes and modifications as are encompassed by the scope of the appended claims.

What is claimed is:

1. A method of controlling a light emitting diode (LED) indicator associated with a communications port on a device, comprising:

identifying all communications ports on a device as either protocol aware or non-protocol aware communications ports;

receiving information to be transmitted over a non-protocol aware communications port;

scheduling transmission of LED commands to an LED indicator associated with the non-protocol aware communications port over a management link;

determining if a management link connected to the non-protocol aware port is busy; and transmitting the LED commands to control operation of the LED indicator, when the management link is not busy, and information over the non-protocol aware communications port.

2. The method as claimed in claim 1, wherein transmitting the LED commands, further comprises:

transmitting a command to turn on the LED indicator, when the associated non-protocol aware communications port is linked to another communications port;

transmitting a command to turn off the LED indicator, when the associated non-protocol aware communications port is not linked to another communications port; and transmitting a command to cause the LED indicator to blink at a predetermined rate, when the associated non-protocol aware communications port is transmitting and/or receiving information to/from another communications port.

3. The method as claimed in claim 2, further comprising:
transmitting information across a protocol aware communications port without transmitting the LED commands.

4. The method recited in claim 3, wherein the protocol aware communications port comprises an InfiniBand capable communication port.

5. A computer program embodied on a computer readable medium and executable by a computer, comprising:
   a port identification code segment to access and identify all ports on a device as either protocol aware or non-protocol aware ports;
   a port monitoring code segment to monitor information transmitted to either a protocol aware port or a non-protocol aware port; and
   a message scheduler code segment to transmit a LED command to an LED associated with a non-protocol aware port, when the port has been identified as a non-protocol aware port;
   wherein, the message scheduler code segment determines if a management link connected to the non-protocol aware communications port is busy, and wherein the LED commands are transmitted to a management entity to control operation of the LED indicator, when the management link is not busy.

6. The computer program as claimed in claim 5 wherein the non-protocol aware port comprises a port that recognizes no data link protocol.

7. The computer program as claimed in claim 6, wherein the message scheduler code segment is activated by the port monitoring code segment to transmit a first LED command to turn on the LED indicator when the associated non-protocol aware port is linked to another port; a second LED command to turn off the LED indicator when the associated non-protocol aware port is not linked to another communications port; and a third LED command to cause the LED indicator to blink at a predetermined rate when the associated non-protocol aware port is transmitting and/or receiving information to/from another port.

8. The computer program as claimed in claim 7, wherein the protocol aware port comprises an InfiniBand capable communication port.

9. A computer readable medium comprising instructions that, when executed by a computer system, perform the method comprising:
   identifying all communications ports on a device as either protocol aware or non-protocol aware ports;
   receiving information to be transmitted over a non-protocol aware port;
   scheduling transmission of LED commands to an LED indicator associated with the non-protocol aware port over a management link;
   determining if a management link connected to the non-protocol aware port is busy; and
   transmitting the LED commands to control operation of the LED indicator, when the management link is not busy.

10. The computer readable medium as claimed in claim 9, wherein transmitting the LED commands, further comprises:
   transmitting a command to turn on the LED indicator, when the associated non-protocol aware port is linked to another port;
   transmitting a command to turn off the LED indicator, when the associated non-protocol aware port is not linked to another port; and
   transmitting a command to cause the LED indicator to blink at a predetermined rate, when the associated non-protocol aware port is transmitting and/or receiving information to/from another port.

11. The computer readable medium as claimed in claim 10, wherein the protocol aware port comprises an InfiniBand capable communication port.

12. A system for controlling an LED indicator associated with a communications port, comprising:
   a port identification module to access and identify all communications ports in a system as either protocol aware or non-protocol aware ports;
   a port monitoring module to monitor link and activity status on either a protocol aware port or a non-protocol aware port; and
   a message scheduler module to transmit an LED command to a module management entity (MME) to control operation of an LED indicator associated with a non-protocol aware port, when the port has been identified as a non-protocol aware port;
   wherein, the message scheduler module determines if a management link connected to the non-protocol aware communications port is busy, and wherein the LED commands are transmitted to a management entity to control operation of the LED indicator, when the management link is not busy.

13. The system as claimed in claim 12, wherein the non-protocol aware port comprises a port that recognizes no data link protocol.

14. The system as claimed in claim 12, wherein the message scheduler module is activated by the port monitoring module to transmit a first LED command to turn on the LED indicator when the associated non-protocol aware port is linked to another communications port; a second LED command to turn off the LED indicator when the associated non-protocol aware port is not linked to another port; and a third LED command to cause the LED indicator to blink at a predetermined rate when the associated non-protocol aware port is transmitting and/or receiving information to/from another port.

15. The system as claimed in claim 14, wherein the protocol aware port comprises an InfiniBand capable communication port.

16. A switch for relaying data between links, comprising:
   a plurality of port modules each including at least an LED indicator and a port provided to establish connection with another device, via one or more links; and
   a switch logic connected to the port modules to control operation of the switch, including to determine if the port included in the corresponding port module is a protocol aware or non-protocol aware port, and to control the LED indicator via the corresponding port module when the port is a non-protocol aware port.
   wherein, the switch logic determines if a management link connected to the non-protocol aware communications port is busy, and wherein the LED commands are transmitted to a management entity to control operation of the LED indicator, when the management link is not busy.

17. The switch as claimed in claim 16, wherein the switch logic comprises:
   a port identification module to access and identify all ports as either protocol aware or non-protocol aware ports;

a port monitoring module to monitor information provided by the switch regarding to the link status of either a protocol aware or a non-protocol aware port; and a message scheduler module to transmit LED commands to a module management entity (MME) to control operation of the LED indicator associated with a non-protocol aware port, when the port has been identified as a non-protocol aware port.

18. The switch as claimed in claim 17, wherein the non-protocol aware port comprises a port that recognizes no data link protocol.

19. The switch as claimed in claim 17, wherein the message scheduler module is activated by the port monitoring module to transmit a first LED command to turn on the LED indicator when the associated non-protocol aware port is linked to another device, via one or more links; a second LED command to turn off the LED indicator when the associated non-protocol aware port is not linked to another device, via one or more links; and a third LED command to cause the LED indicator to blink at a predetermined rate when the associated non-protocol aware port is transmitting and/or receiving data to/from another device.

20. The switch as claimed in claim 17, wherein the protocol aware port comprises an InfiniBand capable communication port.

21. The switch as claimed in claim 17, wherein the switch logic comprises a field programmable gate array (FPGA) arranged to send all appropriate LED commands to the corresponding non-protocol aware port.

* * * * *